March 11, 1930.  C. R. SHORT  1,750,607
SPRING SHACKLE
Filed April 9, 1926

Inventor
Charles R. Short
By Blackmore, Spencer & Flint
Attorneys

Patented Mar. 11, 1930

1,750,607

UNITED STATES PATENT OFFICE

CHARLES R. SHORT, OF DAYTON, OHIO, ASSIGNOR TO GENERAL MOTORS RESEARCH CORPORATION, OF DETROIT, MICHIGAN, A CORPORATION OF DELAWARE

SPRING SHACKLE

Application filed April 9, 1926. Serial No. 100,891.

The object of this invention is to provide an improved joint in which frictional contact between moving parts is eliminated, the movement of the joint being permitted by distortion of a resilient member interposed between the moving parts. The invention is of particular utility in spring shackles for automobiles but is obviously of general application.

In its broadest aspect the invention consists of a rubber bushing arranged between two concentric relatively rotatable members and forced into binding engagement with the members so that upon relative rotation of the parts there will be no rubbing of one part on another but instead the bushing will be distorted. I have preferred to make use of wedges to effect the binding of the rubber to the respective parts and these are preferably so arranged that the rubber is confined axially as well as radially so that it is capable of resisting axial thrusts.

Figure 1:
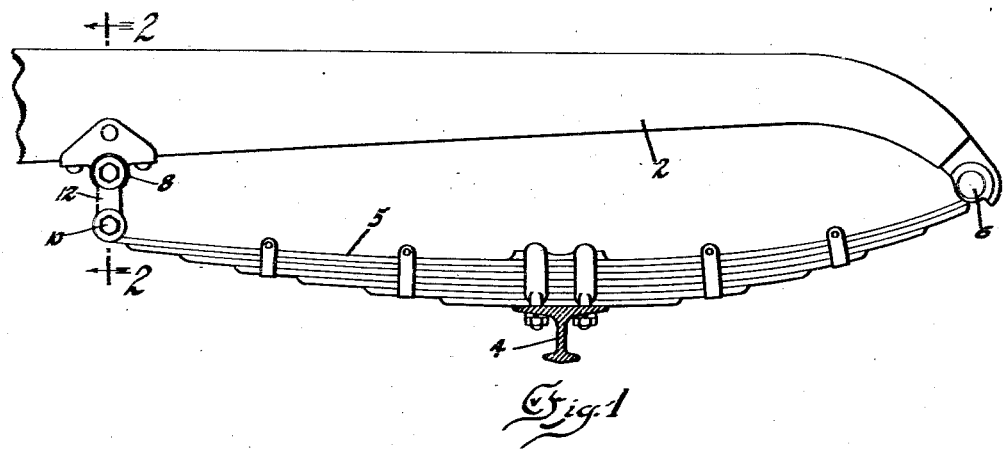
Figure 1 is a side elevation of a conventional automobile spring assembly to which my improved joint is applicable.
Figure 2:
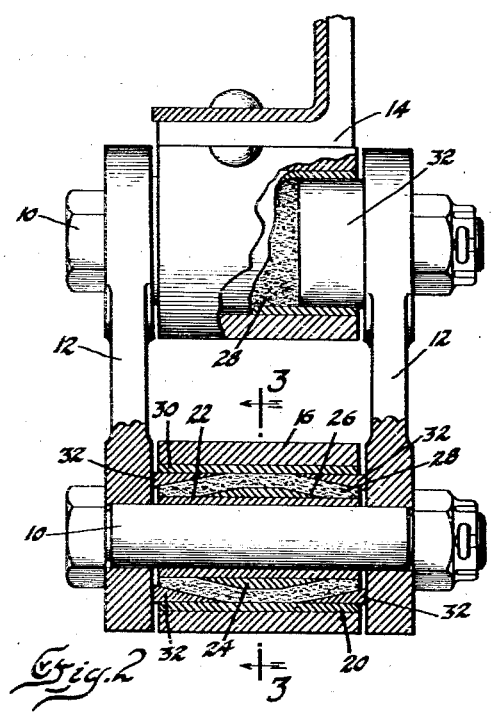
Figure 2 is a partial sectional view on line 2—2 of Figure 1.

The reference character 2 indicates a portion of an automobile frame and 4 represents a part of the front axle, a leaf spring 5 of conventional type being interposed between the axle and frame. The leaf spring is secured to the frame by means of spring shackle 8 at the rear and pivot 6 at the front. While my improved joint is useful in many other relations, I have preferred to illustrate it as employed in connection with the spring shackle 8. It may also be used with equal success at the pivotal connection 6. As shown in Figure 2 the shackle consists of link members 12 connected by shackle bolts 10, the upper bolt being mounted for swinging movement in a bracket 14 secured to the frame 2 and the lower bolt being mounted for swinging movement in an eye 16 formed on the end of the spring 5. As shown in Figure 2 my improved joint is embodied in a removable bushing assembly 20, although, if desired, it may be directly applied to the relatively rotatable parts. The assembly consists of an inner sleeve 22 which is pressed onto the shackle bolt so as to rotate therewith. The sleeve 22 carries a central enlargement 24 tapering at its ends as indicated at 26. Over the sleeve and enlargement which may, if desired, be integral, is disposed a rubber bushing 28 which is in turn surrounded by sleeve 30 which is a pressed fit in the end 16 of the spring. Annular wedges 32 are driven in the ends of the sleeves 30 forcing the bushing 28 into binding engagement with the inner and outer sleeves so that portions of the bushing are carried around with the sleeves in their relative rotation and this movement is accommodated by distortions set up in the body of the bushing. Wedges 32 are held against endwise movement by the links 12 of the spring shackle which in turn are held against separation by the shackle bolts.

A similar joint is used at the upper portion of shackle 8 as indicated in Figure 2.

Figure 4:
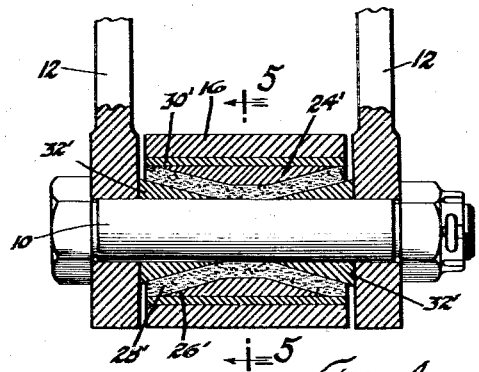
Figure 4 is a view corresponding to Figure 2 with parts broken away showing a modified form.
Figure 3:
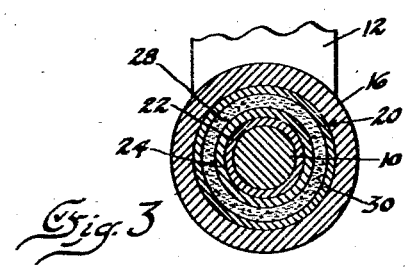
Figure 3 is a section on line 3—3 of Figure 2.
Figure 5:
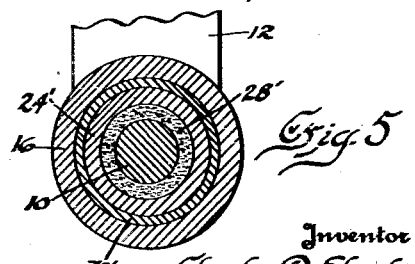
Figure 5 is a section on line 5—5 of Figure 4.

Figures 4 and 5 show a slight modification. In this form the positions of the enlargement and wedges are reversed, enlargement 24' being carried by the outer sleeve 30' and the wedges 32' being carried by the shackle bolt 10.

Attention is called to the fact that the provision of wedge members 32 and 32' and the wedge shaped portions on the enlargement 24 and 24' permits the rubber bushing to cushion the shackle against axial thrusts as well as radial thrusts and at the same time take care of the pivotal action.

While I have confined the description to a rubber bushing it is to be understood that any substance possessing similar qualities may be substituted therefor without departing from the spirit of this invention.

I claim:

1. A joint comprising a plurality of relatively movable concentric members, a rubber bushing having a wall of uniform dimension throughout interposed between said members, and cooperating wedge devices on respective members adapted to force said bushing into gripping engagement with the members.

2. A joint comprising a plurality of relatively movable concentric members a body rubber interposed between said members, the inner member being provided with a central enlargement having outwardly tapering ends, and inwardly tapering wedge members arranged in the ends of said outer member and adapted for cooperation with said central enlargement to force said rubber into gripping engagement with said concentric members, and means for holding the wedge members in position.

3. A spring shackle comprising a plurality of concentric relatively rotatable members, a rubber bushing interposed between said members, and having a wall of uniform width throughout, and relatively movable cooperating tapered elements associated with each member for forcing said bushing into binding engagement with said members.

4. A spring shackle comprising a plurality of concentric relatively rotatable members, a rubber bushing interposed between said members, the interior and exterior surfaces of which are normally in concentric relation with each other, and means for forcing said bushing into binding engagement with said members, and means to deform the bushing axially in response to side thrusts.

5. A bushing comprising inner and outer cylindrical members, a central enlargement having tapered ends formed on one of the members, a rubber bushing interposed between said cylindrical members and covering said enlargement, and annular wedges closely fitting the other of said cylindrical members and urging the bushing into binding relation with the said cylindrical members.

6. A pivot joint comprising a plurality of relatively movable concentric members, a bushing of non-metallic elastic cushioning material interposed between said members, one of the members being provided with a central enlargement having outwardly tapered ends, inwardly tapering wedge members arranged in the respective ends of the other of said members and co-operating with said tapered enlargement to force the material of said bushing into gripping relation with said concentric members, and means for holding the wedge members in position.

In testimony whereof I affix my signature.

CHARLES R. SHORT.